(12) United States Patent
Wang et al.

(10) Patent No.: US 12,181,627 B2
(45) Date of Patent: Dec. 31, 2024

(54) SOURCELESS GAIN STABILIZATION FOR SCINTILLATION COUNTING TOOLS

(71) Applicant: Halliburton Energy Services, Inc., Houston, TX (US)

(72) Inventors: Lei Wang, Burlingame, CA (US); Jeffrey James Crawford, Katy, TX (US); Paravastu Badrinarayanan, Cypress, TX (US); Gordon Layne Moake, Houston, TX (US); Michel LeBlanc, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 1016 days.

(21) Appl. No.: 16/963,806

(22) PCT Filed: May 1, 2018

(86) PCT No.: PCT/US2018/030458
§ 371 (c)(1),
(2) Date: Jul. 21, 2020

(87) PCT Pub. No.: WO2019/212535
PCT Pub. Date: Nov. 7, 2019

(65) Prior Publication Data
US 2021/0048555 A1  Feb. 18, 2021

(51) Int. Cl.
*G01V 5/12* (2006.01)
*E21B 47/00* (2012.01)
(Continued)

(52) U.S. Cl.
CPC ............. *G01V 5/12* (2013.01); *E21B 47/00* (2013.01); *E21B 49/00* (2013.01); *E21B 47/07* (2020.05)

(58) Field of Classification Search
None
See application file for complete search history.

(56) References Cited

U.S. PATENT DOCUMENTS 4,349,736 A * 9/1982 Miller ................ G01V 5/12
250/269.1
5,237,173 A * 8/1993 Stark ................. G01T 1/40
250/252.1

(Continued)

FOREIGN PATENT DOCUMENTS

| EP | 965861 A1 | 12/1999 |
|---|---|---|
| WO | WO 2016/153514 | 9/2016 |
| WO | WO 2016/153518 | 9/2016 |

OTHER PUBLICATIONS

International Search Report and The Written Opinion of the International Search Authority, or the Declaration, Jan. 24, 2019, PCT/US2018/030458, 14 pages, ISA/KR.

(Continued)

*Primary Examiner* — David P Porta
*Assistant Examiner* — Djura Malevic
(74) *Attorney, Agent, or Firm* — DeLizio, Peacock, Lewin & Guerra, LLP

(57) ABSTRACT

The present disclosure describes gain stabilization techniques for scintillation devices which do not require use of an intrinsic reference radiation source. Reference light pulses are emitted into the scintillation device to obtain a signal having a given magnitude. The magnitude of the signal is compared to the magnitude of a reference signal computed as a function of temperature and a degradation factor. A gain adjustment is computed which causes the magnitude of the signal to match the target reference magnitude. The gain adjustment is then used to adjust the system gain so that subsequent output signal amplitudes, measured (Continued)

when energetic photons interact in the scintillator, always correspond to the same energy.

20 Claims, 4 Drawing Sheets

(51) Int. Cl.
*E21B 49/00* (2006.01)
*E21B 47/07* (2012.01)

(56) References Cited

U.S. PATENT DOCUMENTS

| | | | |
|---|---|---|---|
| 5,360,975 A * | 11/1994 | Stoller | G01V 5/04 250/369 |
| 5,369,578 A * | 11/1994 | Roscoe | G01V 5/101 702/8 |
| 5,373,161 A * | 12/1994 | Tararine | G01T 1/208 250/252.1 |
| 5,376,797 A | 12/1994 | Persyk et al. | |
| 5,410,153 A * | 4/1995 | Ferreira | G01T 1/1642 250/252.1 |
| 5,449,897 A * | 9/1995 | Bertelsen | G01T 1/1642 378/207 |
| 5,461,230 A | 10/1995 | Winemiller | |
| 5,475,727 A * | 12/1995 | Buchanan | G01T 1/40 378/53 |
| 5,550,377 A * | 8/1996 | Petrillo | G01T 1/1648 250/252.1 |
| 5,600,135 A * | 2/1997 | Jacobson | G01V 5/04 250/261 |
| 5,610,396 A * | 3/1997 | Mattern | G01T 1/208 250/252.1 |
| 6,006,162 A * | 12/1999 | Haywood | G01J 3/42 702/23 |
| 6,008,494 A | 12/1999 | Jansen | |
| 7,005,646 B1 * | 2/2006 | Jordanov | G01T 1/208 250/252.1 |
| 7,049,598 B1 | 5/2006 | Jordanov et al. | |
| 7,071,474 B2 * | 7/2006 | Wong | G01T 1/1644 250/252.1 |
| 7,081,626 B2 | 7/2006 | Ianakiev et al. | |
| 7,157,681 B1 | 1/2007 | Tetzlaff | |
| 7,274,013 B1 * | 9/2007 | Russ | G01J 3/027 250/252.1 |
| 7,297,957 B1 * | 11/2007 | Vickers | G01T 1/40 250/363.09 |
| 7,339,173 B2 | 3/2008 | Stein et al. | |
| 7,405,404 B1 * | 7/2008 | Shah | C09K 11/7719 250/361 R |
| 7,482,578 B2 | 1/2009 | Randall | |
| 7,642,516 B2 | 1/2010 | Stein et al. | |
| 7,723,694 B2 * | 5/2010 | Frach | H04N 25/773 250/370.11 |
| 7,960,687 B1 | 6/2011 | Simon et al. | |
| 8,084,742 B1 * | 12/2011 | Nagarkar | G01T 1/2008 250/363.03 |
| 8,173,953 B2 * | 5/2012 | Stoller | G01T 1/40 250/361 R |
| 8,395,127 B1 * | 3/2013 | Frach | G01T 1/2985 250/370.11 |
| 8,536,517 B2 * | 9/2013 | Berheide | G01T 1/202 250/252.1 |
| 8,546,749 B2 * | 10/2013 | Berheide | G01T 1/202 250/252.1 |
| 8,957,385 B2 * | 2/2015 | Frank | G01T 7/005 250/362 |
| 10,386,537 B2 * | 8/2019 | Galford | G01T 1/40 |
| 10,527,741 B2 * | 1/2020 | Cho | G01T 1/2985 |
| 10,591,630 B2 * | 3/2020 | Berheide | G01V 5/101 |
| 12,025,767 B2 * | 7/2024 | Grau | G01V 5/234 |
| 2003/0016359 A1 * | 1/2003 | Jung | G01J 3/0283 250/226 |
| 2005/0269513 A1 * | 12/2005 | Ianakiev | G01T 1/20 250/362 |
| 2007/0007005 A1 * | 1/2007 | Heller | E21B 49/081 166/264 |
| 2008/0164407 A1 * | 7/2008 | Choquette | G01T 1/20 250/262 |
| 2008/0203309 A1 * | 8/2008 | Frach | G01T 1/2985 250/362 |
| 2009/0114806 A1 * | 5/2009 | Kirkwood | G01V 5/101 250/269.6 |
| 2009/0114807 A1 * | 5/2009 | Kirkwood | G01V 5/101 250/269.6 |
| 2009/0127449 A1 * | 5/2009 | Iwatschenko-Borho | G01T 7/005 250/252.1 |
| 2010/0116978 A1 * | 5/2010 | Stoller | G01T 1/40 250/361 R |
| 2010/0168947 A1 * | 7/2010 | Winso | G01V 5/26 250/363.01 |
| 2010/0224783 A1 * | 9/2010 | Frank | G01T 1/20 250/369 |
| 2010/0243877 A1 * | 9/2010 | Berheide | G01T 1/202 250/252.1 |
| 2010/0301198 A1 * | 12/2010 | Berheide | G01T 1/202 250/252.1 |
| 2013/0134304 A1 * | 5/2013 | Beekman | G01V 5/101 250/269.6 |
| 2014/0091226 A1 | 4/2014 | Duraj et al. | |
| 2014/0100785 A1 | 4/2014 | Sloan | |
| 2015/0323682 A1 * | 11/2015 | Yang | G01T 3/06 250/362 |
| 2016/0091614 A1 * | 3/2016 | Akers | G01T 7/00 250/261 |
| 2016/0266260 A1 * | 9/2016 | Preston | G01T 1/208 |
| 2016/0291169 A1 * | 10/2016 | Hawrami | C09K 11/7772 |
| 2016/0299240 A1 * | 10/2016 | Cho | G01T 7/005 |
| 2016/0299251 A1 * | 10/2016 | Luo | G01T 1/40 |
| 2016/0306052 A1 * | 10/2016 | Ramsden | G01T 1/169 |
| 2017/0139063 A1 | 5/2017 | Mickael | |
| 2017/0168192 A1 | 6/2017 | Vasilyev et al. | |
| 2017/0355905 A1 * | 12/2017 | Bourret-Courchesne | G01T 1/2023 |
| 2018/0074215 A1 * | 3/2018 | Marsden | G01T 1/1647 |
| 2018/0156926 A1 * | 6/2018 | Frach | G01T 1/1642 |
| 2018/0275309 A1 * | 9/2018 | Berheide | G01V 5/101 |
| 2018/0329090 A1 * | 11/2018 | Mccleskey | G01V 5/12 |
| 2020/0371256 A1 * | 11/2020 | Rauer | G01F 1/78 |
| 2022/0268952 A1 * | 8/2022 | Liang | G01V 5/02 |

OTHER PUBLICATIONS

Stowell, et al., "Borehole Radiometrics—Past, Present and Future," Mount Sopris Instrument Company, pp. 1-6.

* cited by examiner

SOURCELESS GAIN STABILIZATION FOR SCINTILLATION COUNTING TOOLS

PRIORITY

The present application is a U.S. National Stage patent application of International Patent Application No. PCT/US2018/030458, filed on May 1, 2018, the benefit of which is claimed and the disclosure of which is incorporated herein by reference in its entirety.

FIELD OF THE DISCLOSURE

The present disclosure generally relates to scintillation counting and, more particularly, to sourceless gain stabilization in scintillation counting tools.

BACKGROUND

In scintillation counting applications, the detector comprises a scintillator (e.g., inorganic or organic crystals) and a photodetector (e.g., photomultiplier tube ("PMT") or photodiode). When an ionizing radiation event occurs, a fluorescent flash is produced in the scintillator as a result of electron excitations, thereby converting incoming ionizing radiation (e.g. gamma rays and electrons) into light. The fluorescent light then enters the photodetector photocathode (for PMT) or P-N junction (for photodiode) through optical coupling. In the PMT case, light interacts with the photocathode to emit photoelectrons which are multiplied by multiple high-voltage-biased dynode stages in the vacuum. This produces a voltage signal at the anode, thereby converting the incoming light into a voltage signal. Electronics at the anode output discriminate the amplitudes of the charge pulses to determine the energy level of the radiation. The information obtained can then be used for medical imaging, material analysis, structure inspection, downhole formation evaluation, and etc.

One issue with conventional scintillator/PMT detector systems is the light yield/gain change over time and temperature. To mitigate this issue, a low strength radioactive source (e.g., Cs137) is often integrated to the measurement system to establish a reference. With this known energy level, the measurement system is able to stabilize the overall system gain regardless of the detector performance drift over time or temperature. However, in many applications, having a radioactive source for reference purposes is not desirable. Since it is a hazardous material, its use is accompanied with additional regulatory requirements (e.g., import/export restrictions) and costs.

DESCRIPTION OF ILLUSTRATIVE EMBODIMENTS

Figure 1:
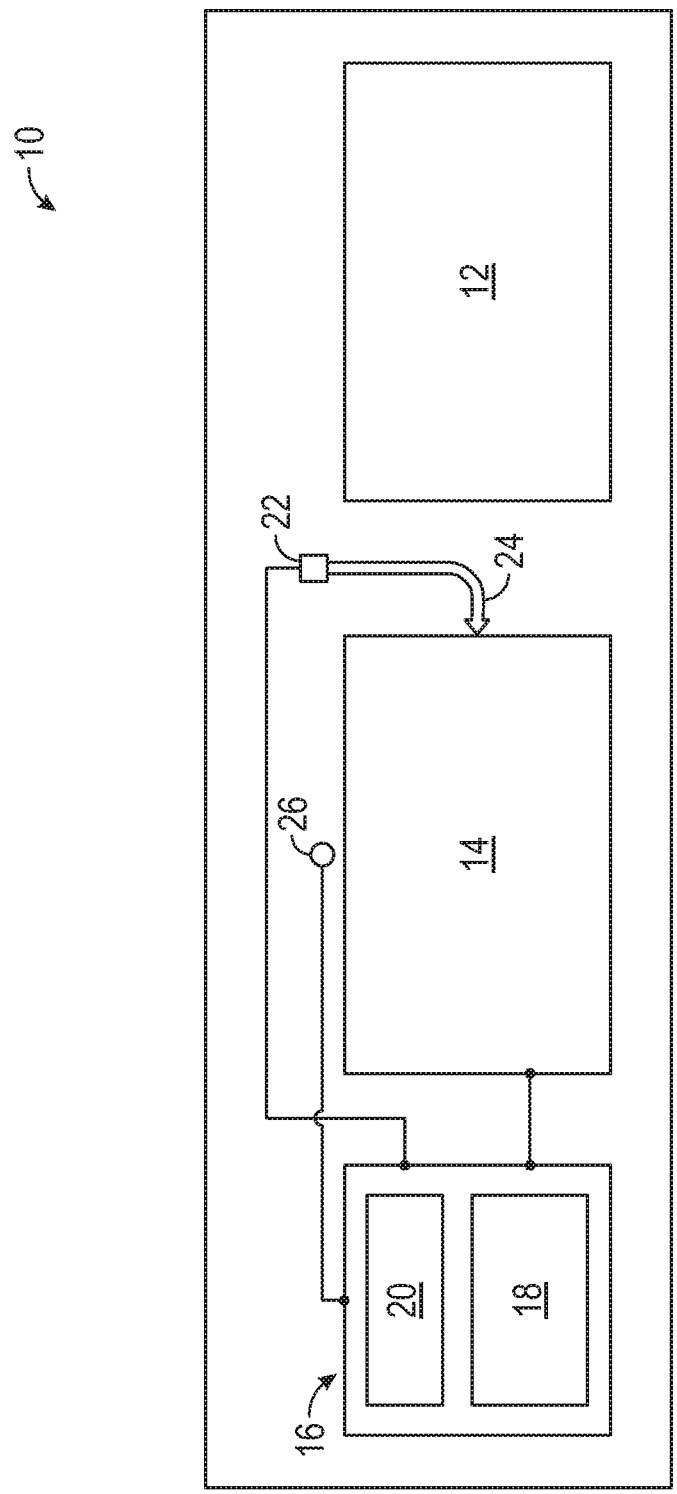
FIG. 1 is a block diagram of a gain stabilization system, according to illustrative embodiments of the present disclosure.

Illustrative embodiments and related methods of the present disclosure are described below as they might be employed in systems and methods for gain stabilization of a scintillation device without the use of an intrinsic radioactive source. In the interest of clarity, not all features of an actual implementation or method are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure. Further aspects and advantages of the various embodiments and related methods of the disclosure will become apparent from consideration of the following description and drawings.

As described herein, embodiments and methods of the present disclosure perform gain stabilization of scintillation devices without the need for an intrinsic reference radiation source. To achieve this, embodiments of the present disclosure utilize reference light pulses inserted into the scintillation device to obtain a reference signal having a given magnitude. The measured magnitude of the reference signal is then compared to the target magnitude of the reference signal that is computed as a function of temperature and a degradation factor, as described herein. A gain adjustment is then computed with causes the measured magnitude of the signal to match the target reference magnitude. The gain adjustment is then used to adjust the system gain so that subsequent output signal amplitudes, measured when energetic photons interact in the scintillator, always correspond to the same energy. The described gain stabilization is accomplished by either adjusting the high voltage supplied to the photodetector, the electronic gain applied to the output signal (i.e., signal amplification), or a combination of the two—any of which are referred to herein as gain stabilization.

A generalized method of the present disclosure involves emitting light pulses into the scintillation device using a reference light source. The pulses are generated so that the resultant reference signal can be distinguished from the expected signals from ionizing radiation. In response to the light pulses, a signal is measured and the corresponding magnitude is determined. This measured magnitude is then compared to its target magnitude (also referred to as a "target reference magnitude"), wherein the target reference magnitude is computed using a first variable representing light output of the reference light source as a function of temperature, a second variable representing light output of the scintillator as a function of the temperature, and a degradation factor representing systematic gain shifts of the scintillation device. A gain adjustment is then computed that causes the measured reference magnitude to match the target reference magnitude. As used herein, a "match" between the signals may be an exact match or a match within some threshold tolerance (e.g., within 1-2% of the reference signal). The gain adjustment is then applied to the scintillation device. The gain stabilization may be performed continuously or intermittingly. With the device stabilized, energy deposited in the scintillator by ionizing radiation can be properly measured.

FIG. 1 is a block diagram of a gain stabilization system, according to illustrative embodiments of the present disclosure. Gain stabilization system 10 includes a scintillator 12 which may be, for example, an organic or inorganic crystal. Scintillator 12 is optically coupled to a photodetector 14 which may be, for example, a PMT or photodiode. Photodiode 14 is coupled to a control system 16, which includes a power supply 20 and processing circuitry 18 (also referred to herein as "electronics"). Power supply 20 may be any suitable power supply, such as, for example, a high voltage power supply (e.g., 900-1400V) to drive photodetector 14 and a lower power voltage supply (e.g., 1-5V) to drive processing circuitry 18.

Processing circuitry 18 controls gain stabilization system 10 and effects performance of the methods described herein. Although illustrated as being part of gain stabilization system 10, processing circuitry 18 may also be located remotely from gain stabilization system 10 in other illustrative embodiments. Nevertheless, in either case, processing circuitry 18 would comprise a signal processor, drivers, amplifiers, analog to digital converters, communications modules and other circuitry necessary to achieve the objectives of the present disclosure. In addition, it will also be recognized that the software instructions necessary to carry out the objectives of the present disclosure may be stored within storage located within the processing circuitry or loaded into that storage from a CD-ROM or other appropriate storage media via wired or wireless methods. Such software and processing circuitry will enable the processing/gain stabilization/photon counting of the ionizing radiation. If the processing circuitry is remotely located, a suitable wired or wireless communications link may provide a medium of communication between the processing circuitry and the sensing module. Alternatively, however, the communications link may be an electromagnetic device of suitable frequency, or other methods including acoustic communication and like devices.

Control system 16 is also coupled to a reference light source 22. In certain embodiments, reference light source 22 is a light emitting diode ("LED") or laser. In the illustrated embodiment, reference light source 22 is directly optically coupled to photodetector 14 via optical fiber 24. However, in alternate embodiments, reference light source 22 may instead be optically coupled directly to scintillator 12 via an optical fiber. In either embodiments, the fundamental operation of the disclosure is the same. Control system 16 is also coupled to temperature sensor 26 positioned adjacent to photodetector 14 which obtains the temperature of photodetector 14. In alternative embodiments, multiple temperature sensors may form part of gain stabilization system 10 and be positioned adjacent scintillator 12, reference light source 22 or control system 16. As described below, these temperature sensors are used to obtain temperature measurements of various components of gain stabilization system 10 in order to compute the temperature related transfer functions described herein.

Still referring to the illustrative embodiment of FIG. 1, reference light source 22 has a dominant wavelength which matches the quantum efficiency response of photodetector 14. As will be described in more detail below, the gain of the photon detector (of which gain stabilization system 10 forms part of) is stabilized using a temperature function of reference light source 22, a temperature function of scintillator 12, and a degradation ratio of gain stabilization system 10. The variables for the temperature functions are provided by the temperature measurements obtained by sensor 26. Crystal materials such as, for example, CeBr3 and LaBr3 with stable temperature performance may be selected as scintillator 12. In certain illustrative embodiments, characterization (i.e., generation of the temperature functions) of the specific crystal type may only be conducted once for each type/size of crystal.

To determine the system gain adjustment of the present disclosure, variations in the factors that affect the signal magnitudes must be evaluated. There are several factors that affect the final output signal that is obtained from a photon measurement device, each of which are subject to change over time. They include the following factors: (1) the amount of light produced by the scintillator per unit of energy deposited in the crystal, (2) the fraction of generated light that reaches the photodetector, (3) the light-to-current efficiency of the photodetector at a fixed high voltage (photodetector requires an applied high voltage to operate), (4) the amount of high voltage applied to the photodetector, and (5) the electronic gain that is applied to the output signal of the photodetector. Factors 4 and 5 are manipulated in the present disclosure.

The voltage measured by gain stabilization system 10 for a photon that deposits energy E in the crystal is given by:

$$V_E = C_E f_{crystal}(T) E A_0 A D_{photon} \qquad \text{Eq(1)},$$

where $T_0$ is a reference temperature; $C_E$ is the light output per unit energy at $T_0$; the variable $f_{crystal}(T)$ is the scintillator temperature function and represents the temperature dependence of the light output per unit energy of the scintillator and is 1 at $T_0$; E is the energy deposited in the scintillator/crystal; $A_0$ is the gain resulting from the nominal electronic gain and high voltage settings; A is the gain adjustment required to stabilize the gain; and $D_{photon}$ is a degradation factor that accounts for the loss of light generated by the photon in traveling to the photocathode of the PMT (photodetector 14). $D_{photon}$ may also account for changes in conversion efficiency of the crystal. No degradation corresponds to a value of 1.

Illustrative embodiments of the present disclosure adjusts the gain so that $V_E$ is the same as nominal conditions with no degradation. This is achieved when:

$$V_E = C_E f_{crystal}(T) E A_0 A D_{photon} = C_E E A_0 \qquad \text{Eq(2)}.$$

Equation (2) can be solved for A to yield:

$$A = \frac{1}{f_{crystal}(T) D_{photon}}. \qquad \text{Eq(3)}$$

The value of A given by Equation (3) represents the desired gain adjustment.

The voltage measured by the system for a reference light pulse (e.g., an LED) can be written as:

$$V_{LED} = A_0 A V_{0,LED} f_{LED}(T) D_{LED} \qquad \text{Eq(4)},$$

where $V_{0,LED}$ is the measured voltage that is obtained at $T_0$ with no degradation ($D_{LED}$ is 1); the variable $f_{LED}(T)$ is the reference light source temperature function that describes variations in the light output of the LED with temperature, and it has a value of 1 at $T_0$; and $D_{LED}$ is a degradation factor that accounts for the loss of LED light that occurs between the LED and photocathode of the PMT (photodetector 14). $D_{LED}$ can also account for deviations of light output from one LED to another. Again, no degradation corresponds to a value of 1.

Inserting desired gain adjustment given by Equation (3) into Equation (4) yields the desired location of the LED voltage peak:

$$V_{LED} = \frac{A_0 \ V_{0,LED} f_{LED}(T) \ D_{LED}}{f_{crystal}(T) D_{photon}}. \qquad \text{Eq(5)}$$

Here, $A_0$ is arbitrary and $V_{0,LED}$ is chosen so that the LED signal is above/outside the spectrum obtained from ionizing radiation during normal measurement operations. As a result, the LED signal will be distinctive from signals obtained from photon sources other than the LED source.

For simplicity, Equation (5) can be rewritten as:

$$V_{LED} = \frac{A_0 \ V_{0,LED} f_{LED}(T) \ R_D}{f_{crystal}(T)}, \qquad \text{Eq(6)}$$

where the degradation ratio is:

$$R_D = \frac{D_{LED}}{D_{photon}}. \qquad \text{Eq(7)}$$

Accordingly, the illustrative gain stabilization methods of the present disclosure are achieved by measuring the temperature of gain stabilization system 10, computing a degradation ratio, and adjusting the additional gain of the system, A, accordingly so that measured magnitude of the signal from the reference light source (e.g., voltage or current peak) is given by Equation (6). Illustrative methods for determining $f_{LED}(T)$, $f_{crystal}(T)$, and $R_D$ are described below.

The LED (or other referenced light source) 22 is controlled by electronics/processing circuitry 18 to produce photons. The LED is activated in short bursts, each of which produces a number of photons. The photons pass through the optical fiber 22 and possibly the scintillator 12 before striking the photodetector 14 and generating a signal. The burst length is shorter than the processing time of the processing circuitry 18, so that all the photons from one burst that reach the photodetector are included in the signal. As the temperature varies, the current passing through the LED will also vary, as will the number of photons produced by the LED. The circuitry may compensate for the variations by controlling the voltage applied to the LED and/or the time of the burst so as to keep the number of photons emitted by the LED in a given burst uniform. To compensate for residual variations, the residual variation ($f_{LED}(T)$ in Equation 6) may be characterized as a function of temperature. It may be adequate to determine the function for a set of LEDs and use the same function for all LEDs of that type, or the function may be determined separately for each LED.

To characterize the reference light source output drift, the LED-equipped (or other referenced light source) system 10 without photodetector 14, goes through a thermal measurement sequence. The LED output is coupled through an optical fiber into a spectrophotometer to record the light intensity spectrum over the entire characterization temperature range. The fractional change in the spectral peaks with temperature determine the function $f_{LED}(T)$. The study may be conducted with LEDs that have experienced different operational times, resulting in different functions for different operation intervals (e.g., 0-100 hours, 100-200 hours, and etc.), to account for degradations of reference light source 22 over time.

To compute the temperature function $f_{crystal}(T)$ of scintillator 12 in one example, test crystals are coupled to a small radioactive source with a distinctive photopeak placed close to the crystal. The test crystal and source are both enclosed inside a chamber, which may provide shielding from external radiation. The chamber temperature is varied and the output of the test crystal is monitored by a spectrophotometer. The fractional change in the measured signal peaks from the crystal determines $f_{crystal}(T)$. Long term thermal test data may also be studied to determine operation intervals for $f_{crystal}(T)$ and different functions for each operation interval (e.g., 0-100 hours, 100-200 hours, and etc.).

The degradation ratio $R_D$ is a factor that represents systematic gain shifts of gain stabilization system 10. To determine the ratio of degradation factor in certain illustrative embodiments of the present disclosure, only the ratio of $R_D$ needs to be calibrated, not the individual factors $D_{LED}$ and $D_{photon}$. As stated above, $D_{LED}$ represents a loss of light occurring as light travels from the reference light source to the photodetector, while $D_{photon}$ represents the loss of light occurring as light travels from the crystal to the photodetector. These two degradation factors are expected to change slowly, so intermittent calibration should be acceptable. The ratio can be calibrated initially by exposing gain stabilization system 10 to an external radioactive source that emits a known spectrum with a feature that can be easily identified and has a specific energy value. This could be done by placing a source such as Cs-137 nearby gain stabilization system 10. The photopeak at 662 keV would make a good reference. However, it would be more convenient if no extra steps or sources are required than those used in a standard calibration. Standard calibrations in oil and gas applications for density tools, for example, measure a low-density and a high-density standard with a logging source inserted in the tool. The spectra obtained in these measurements have identifiable features that correspond to a specific energy.

Figure 2A:
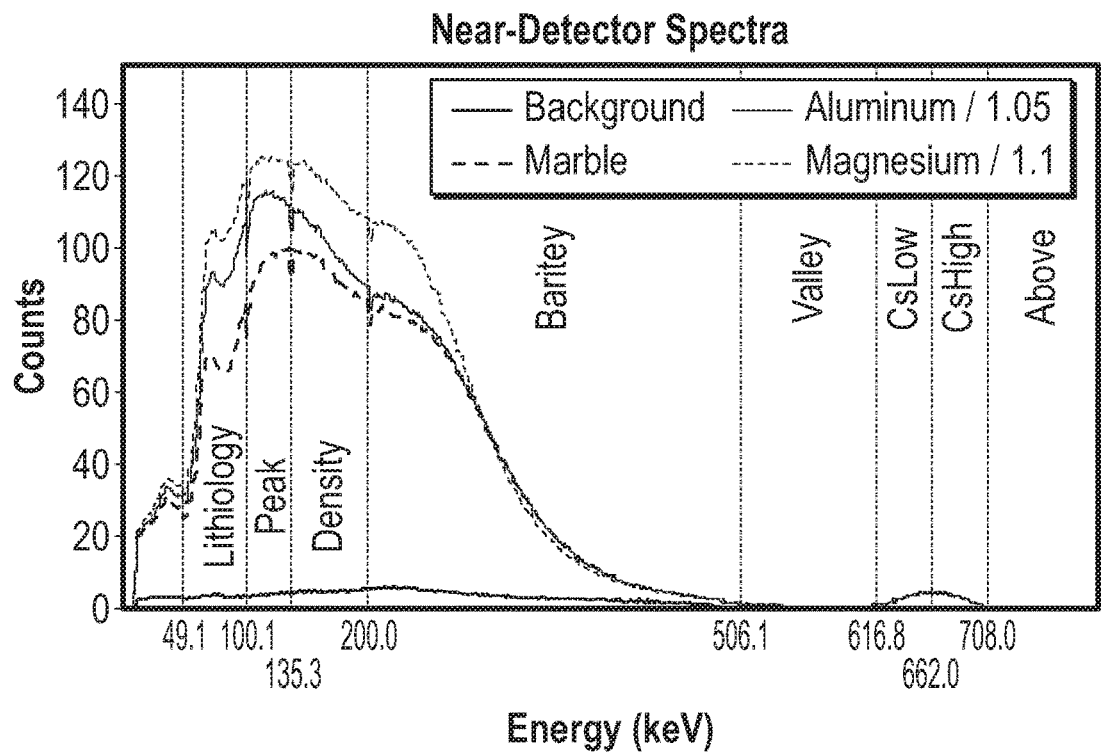
FIGS. 2A and 2B a graphs of typical spectra from measurements obtained with the near and far detectors, respectively, and useful to describe methods of the present disclosure.
Figure 2B:
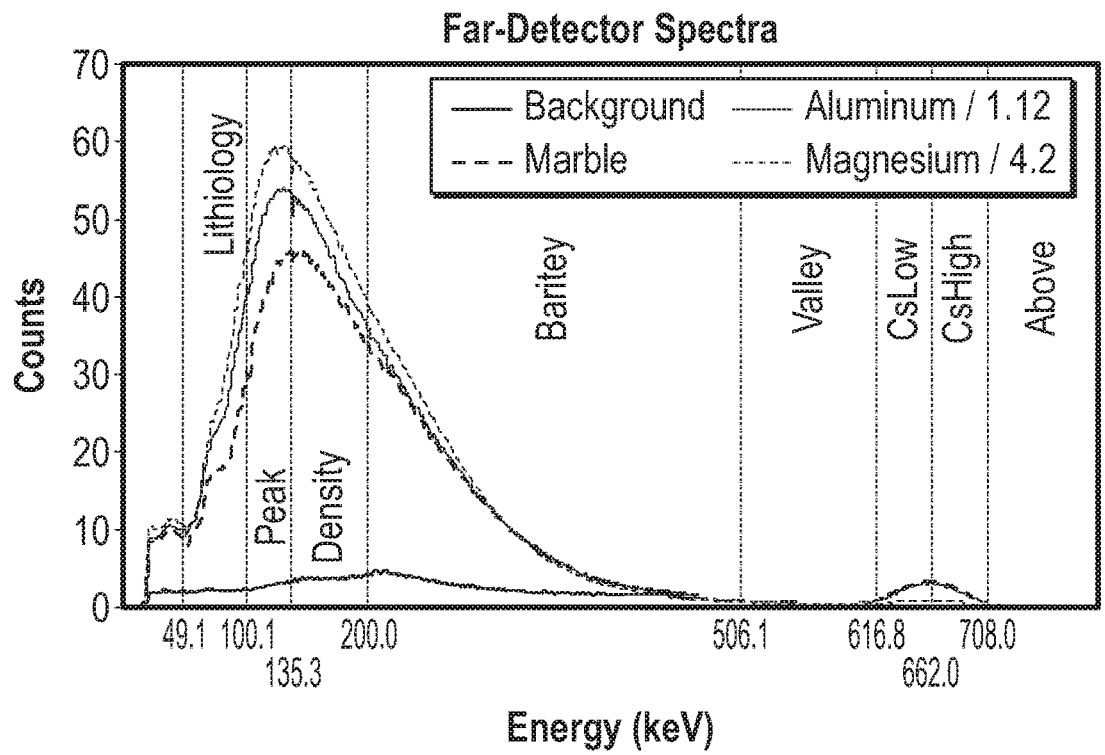

FIGS. 2A and 2B are graphs of typical spectra from measurements obtained with the near and far detectors, respectively, of a density tool. In the illustrated example, the magnesium calibration point would be the best candidate because it has higher count rates, so its features can be more precisely identified/determined. The far detector has a single peak at about 130 keV that is easy to identify. The near-detector spectrum is more complicated; the edge of the falling slope at about 300 keV may provide the best feature to identify. Note the peak at 662 KeV rises from the small Cs-137 source that is placed near the tool (it would not be present during operation of gain stabilization system 10).

An illustrative calibration procedure for $R_D$ for a density tool places the tool in a magnesium calibration block and loads a source into the tool. A spectrum is measured and the location of a reference point of the spectrum is determined. If that location is not in the desired channel, the system gain is increased until is the desired channel is reached. The location of the LED peak is then measured. The temperature of gain stabilization system 10 is then measured using one or more sensors 26. During the initial calibration, $R_D$ is set to one and Equation (6) is used to determine the value of $A_0 V_{0,LED}$ for which the computed LED location in the spectrum (which corresponds to a magnitude) is equal to the measured location. The value of $A_0 V_{0,LED}$ is fixed and remembered. In subsequent calibrations, the value of $R_D$ is chosen so that Equation (6) computes the measured location.

After this calibration process has been accomplished, the photon measurement tool of which gain stabilization system 10 forms part of is stabilized using $A_0 V_{0,LED}$, $R_D$ and the reference light source and scintillator temperatures described herein to compute the desired reference light source magnitude (location in the spectrum) $V_{LED}$ using Equation (6). The gain adjustment necessary to cause the measured magnitude of the reference light source signal to match $V_{LED}$ is then computed and used to adjust the system gain.

Figure 3:
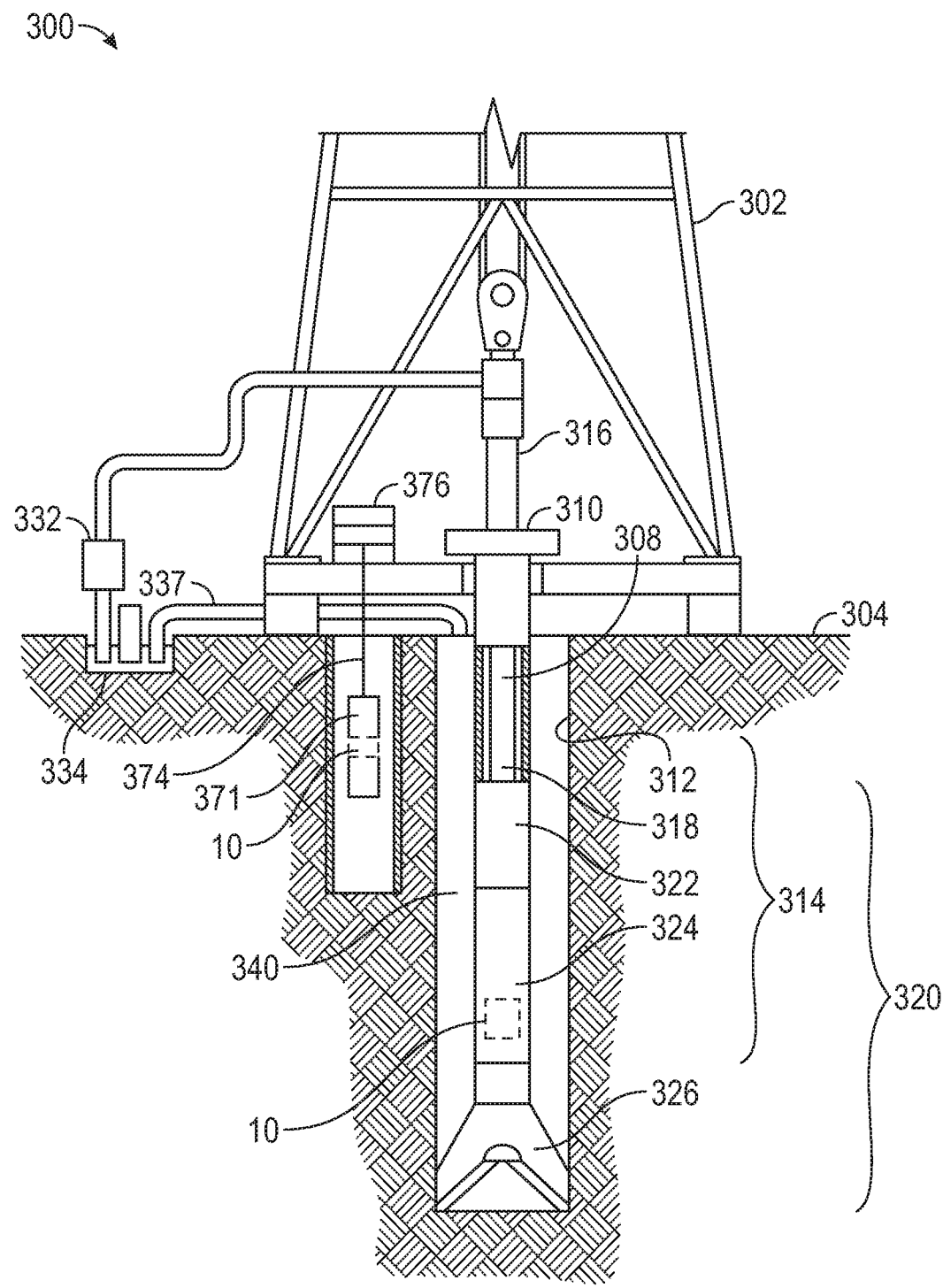
FIG. 3 illustrates a system for logging operations according to an illustrative method of the present disclosure.

Although the gain stabilization systems described herein may be used in a variety of applications (e.g., medical imaging), the following description is a wellbore application. FIG. 3 illustrates a system 300 for logging operations according to an illustrative method of the present disclosure. It should be noted that the system 300 can also include a system for pumping or other operations. System 300 includes a drilling rig 302 located at a surface 304 of a wellbore. Drilling rig 302 provides support for a downhole apparatus, including a drill string 308. Drill string 308 penetrates a rotary table 310 for drilling a borehole/wellbore 312 through subsurface formations 314. Drill string 308 includes a Kelly 316 (in the upper portion), a drill pipe 318 and a bottomhole assembly 320 (located at the lower portion of drill pipe 318). In certain illustrative embodiments, bottomhole assembly 320 may include drill collars 322, a downhole tool 324 and a drill bit 326.

Although downhole tool 324 may be any of a number of different types of tools including measurement-while-drilling ("MWD") tools, logging-while-drilling ("LWD") tools, etc., in this embodiment downhole tool 324 is a scintillation measurement device that includes a gain stabilization system 10 as described herein. Although not shown, scintillation measurement device 324 may also include a radiation source to emit radiation and irradiate the surrounding formation, causing backscattering which is detected by its detectors. While tool 324 is downhole, it may be intermittingly or continuously stabilized using the embodiments and methods described herein. Examples of a photon measurement tool in which the present gain stabilization system may be implemented are gamma-gamma density tools and natural gamma ray tools. The measurements obtained by tool 324 may be used to perform a number of downhole operations, such as, for example, determining downhole properties and generating images of the surrounding formation, which can be used to plan, drill, or implement a wellbore completion plan.

During drilling operations, drill string 308 (including Kelly 316, drill pipe 318 and bottom hole assembly 320) may be rotated by rotary table 310. In addition or alternative to such rotation, bottom hole assembly 320 may also be rotated by a motor that is downhole. Drill collars 322 may be used to add weight to drill bit 326. Drill collars 322 also optionally stiffen bottom hole assembly 320 allowing it to transfer the weight to drill bit 326. The weight provided by drill collars 322 also assists drill bit 326 in the penetration of surface 304 and subsurface formations 314.

During drilling operations, a mud pump 332 optionally pumps drilling fluid (e.g., drilling mud), from a mud pit 334 through a hose 336, into drill pipe 318, and down to drill bit 326. The drilling fluid can flow out from drill bit 326 and return back to the surface through an annular area 340 between drill pipe 318 and the sides of borehole 312. The drilling fluid may then be returned to the mud pit 334, for example via pipe 337, and the fluid is filtered. The drilling fluid cools drill bit 326, as well as provides for lubrication of drill bit 326 during the drilling operation. Additionally, the drilling fluid removes the cuttings of subsurface formations 314 created by drill bit 326.

Still referring to FIG. 3, scintillation measurement device 324 may also include any number of sensors which monitor different downhole parameters and generate data that is stored within one or more different storage mediums within the downhole tool 324. Alternatively, however, the data may be transmitted to a remote location (e.g., surface) and processed accordingly. Such parameters may include logging data related to the various characteristics of the subsurface formations (such as resistivity, radiation, density, porosity, etc.) and/or the characteristics of the borehole (e.g., size, shape, etc.), etc.

FIG. 3 also illustrates an alternative embodiment in which a wireline system is deployed. In such an embodiment, the wireline system may include a downhole tool body 371 coupled to a base 376 by a logging cable 374. Logging cable 374 may include, but is not limited to, a wireline (multiple power and communication lines), a mono-cable (a single conductor), and a slick-line (no conductors for power or communications). Base 376 is positioned above ground and optionally includes support devices, communication devices, and computing devices. In this example, tool body 371 houses a scintillation measurement device and any one of the gain stabilization systems 10 described herein. In an embodiment, a power source (not shown) is positioned in tool body 371 to provide power to the tool 371. In operation, the wireline system is typically sent downhole after the completion of a portion of the drilling. More specifically, in certain methods, drill string 308 creates borehole 312, then drill string 308 is removed, and the wireline system is inserted into borehole 312, as will be understood by those ordinarily skilled in the art having the benefit of this disclosure. Note that only one borehole is shown for simplicity in order to show the tools deployed in drilling and wireline applications. In certain applications, such as ranging, multiple boreholes would be drilled as understood in the art.

Figure 4:
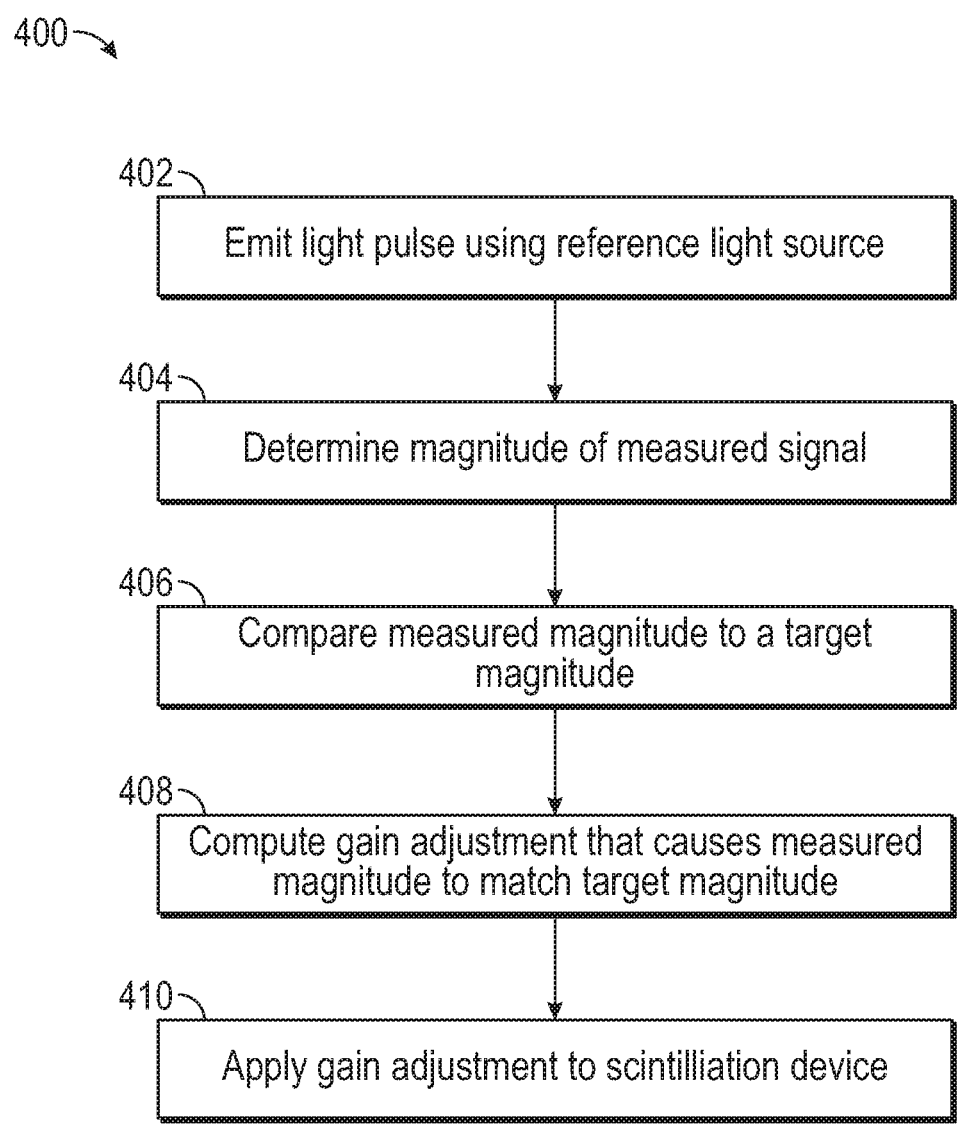
FIG. 4 is a flow chart of a method for gain stabilization of a scintillation device, according to certain illustrative methods of the present disclosure.

FIG. 4 is a flow chart of a method for gain stabilization of a scintillation device, according to certain illustrative methods of the present disclosure. In one illustrative application, a scintillation measurement device which includes gain stabilization system 10 may be deployed downhole. Over time, the scintillation measurement device will require stabilization to correct for drift and degradation—at which time, gain stabilization system 10 will be initiated. At block 402 of method 400, light pulses are emitted into the scintillation device using a reference light source. In response to the light pulses, control system 16 measures a signal from the scintillation device using photodetector 14. At block 404, a magnitude representative of the measured reference signal is determined. At block 406, the measured magnitude is compared to a target reference magnitude. Here, the target reference magnitude is computed using a first variable representing light output of the reference light source as a function of temperature, a second variable representing light output of the scintillator as a function of the temperature, and the degradation factor representing systematic gain shifts of the scintillation device. At block 408, control system 16 computes a gain adjustment that causes the measured magnitude to match the reference magnitude. With reference to FIGS. 2A and 2B, to illustrate an example of the gain adjustment, consider how the voltage peak of magnesium is around 130 KeV. Over time, however, due to thermal drift or degradation, that nominal peak may drift to 100 or 75 KeV, for example. Using the stabilization methods described herein, the gain adjustment necessary to move the peak from 100 or 25 KeV back to the 130 KeV nominal peak is calculated. Thereafter, at block 410, the gain adjustment may then be applied to the scintillation device such that subsequent measurements are accurate.

Accordingly, embodiments of the present disclosure provide stabilization of scintillation counters without the use of an intrinsic radiation source. As a result, the associated costs and regulatory requirements are avoided.

Embodiments and methods described herein further relate to any one or more of the following paragraphs:

1. A method for gain stabilization of a scintillation device having a scintillator and photodetector, the method comprising emitting light pulses into the scintillation device using a reference light source; in response to the light pulses, measuring a signal from the scintillation device; determining a magnitude representative of the measured signal; comparing the measured magnitude to a target reference magnitude, wherein the target reference magnitude is computed using: a first variable representing light output of the reference light source as a function of temperature; a second variable representing light output of the scintillator as a function of the temperature; and a degradation factor representing systematic gain shifts of the scintillation device; computing a gain adjustment that causes the measured magnitude to match the target reference magnitude; and applying the gain adjustment to the scintillation device.

2. The method as defined in paragraph 1, wherein the measured signal in response to the light pulses is distinctive from signals obtained from other photon sources.

3. The method as defined in paragraphs 1 or 2, wherein the measured magnitude is a peak voltage or peak current of the measured signal.

4. The method as defined in any of claims 1-3, wherein the light pulses enter the photodetector of the scintillation device after passing through a scintillator; or without passing through a scintillator.

5. The method as defined in any of paragraphs 1-4, wherein an optical fiber is used to optically couple the reference light source to the photodetector or scintillator.

6. The method as defined in any of paragraphs 1-5, wherein an LED or laser is used as the reference light source to emit the light pulses.

7. The method as defined in any of paragraphs 1-6, wherein the degradation factor is a ratio of a first and second factor, the first factor representing a loss of light occurring as light travels from the reference light source to the photodetector, and the second factor representing a loss of light occurring as light travels from the scintillator to the photodetector.

8. The method as defined in any of paragraphs 1-7, wherein comparing the measured magnitude to the reference magnitude comprises obtaining a temperature of one or more of the photodetector, scintillator, or electronics of the scintillation device.

9. The method as defined in any of paragraphs 1-8, wherein applying the gain adjustment to the scintillation device comprises one or both of adjusting a high voltage component of the scintillation device; and adjusting a signal amplification of the scintillation device.

10. The method as defined in any of paragraphs 1-9, wherein the degradation factor is calculated by measuring a known spectrum.

11. The method as defined in any of paragraphs 1-10, wherein the scintillation device is used to perform an evaluation of a downhole formation.

12. A system for gain stabilization of a scintillation device, comprising a reference light source; a scintillator; a photodetector optically coupled to the scintillator; and one or more processors coupled to the reference light source and photodetector and operable to cause the system to perform operations comprising emitting light pulses into the scintillation device using a reference light source; in response to the light pulses, measuring a signal from the scintillation device; determining a magnitude representative of the measured signal; comparing the measured magnitude to a target reference magnitude, wherein the target reference magnitude is computed using a first variable representing light output of the reference light source as a function of temperature; a second variable representing light output of the scintillator as a function of the temperature; and a degradation factor representing systematic gain shifts of the scintillation device; computing a gain adjustment that causes the measured magnitude to match the target reference magnitude; and applying the gain adjustment to the scintillation device.

13. The system as defined in paragraph 12, wherein the measured signal in response to the light pulses is distinctive from signals obtained from other photon sources.

14. The system as defined in paragraphs 12 or 13, wherein the measured magnitude is a peak voltage or peak current of the measured signal.

15. The system as defined in any of paragraphs 12-14, further comprising an optical fiber directly coupling the reference light source to the photodetector or scintillator.

16. The system as defined in any of paragraphs 12-15, wherein the reference light source is an LED or laser.

17. The system as defined in any of paragraphs 12-16, wherein the degradation factor is a ratio of a first and second factor, the first factor representing a loss of light occurring as light travels from the reference light source to a photodetector, and the second factor representing a loss of light occurring as light travels from a scintillator to the photodetector.

18. The system as defined in any of paragraphs 12-17, further comprising a temperature sensor positioned adjacent the photodetector, scintillator, or electronics of the scintillation device.

19. The system as defined in any of paragraphs 12-18, wherein applying the gain adjustment to the scintillation device comprises one or both of adjusting a high voltage component of the scintillation device; and adjusting a signal amplification of the scintillation device.

20. The system as defined in any of paragraphs 12-19, wherein the degradation factor is calculated by measuring a known spectrum.

21. The system as defined in any of paragraphs 12-20, wherein the system forms part of a logging, drilling, or wireline assembly.

Although various embodiments and methods have been shown and described, the disclosure is not limited to such embodiments and methods and will be understood to include all modifications and variations as would be apparent to one skilled in the art. Therefore, it should be understood that embodiments of the disclosure are not intended to be limited to the particular forms disclosed. Rather, the intention is to cover all modifications, equivalents and alternatives falling within the spirit and scope of the disclosure as defined by the appended claims.

What is claimed is:

1. A method for gain stabilization of a scintillation device having a scintillator and photodetector, the method comprising:

emitting light pulses into the scintillation device using a reference light source, wherein the scintillation device does not employ an intrinsic radioactive source;

in response to the light pulses, measuring a signal from the scintillation device;

determining a magnitude representative of the measured signal;

comparing the measured magnitude to a target reference magnitude, wherein the target reference magnitude is computed using:

a first variable representing light output of the reference light source as a function of temperature;

a second variable representing light output of the scintillator as a function of temperature; and a degradation factor representing systematic gain shifts of the scintillation device;

computing a gain adjustment that causes the measured magnitude to match the target reference magnitude; and applying the gain adjustment to the scintillation device.

2. The method as defined in claim 1, wherein the measured signal in response to the light pulses is distinctive from signals obtained from other photon sources.

3. The method as defined in claim 1, wherein the measured magnitude is a peak voltage or peak current of the measured signal.

4. The method as defined in claim 1, wherein the light pulses enter the photodetector of the scintillation device:
after passing through a scintillator; or
without passing through a scintillator.

5. The method as defined in claim 1, wherein an optical fiber is used to optically couple the reference light source to the photodetector or scintillator.

6. The method as defined in claim 1, wherein an LED or laser is used as the reference light source to emit the light pulses.

7. The method as defined in claim 1, wherein the degradation factor is a ratio of a first and second factor, the first factor representing a loss of light occurring as light travels from the reference light source to the photodetector, and the second factor representing a loss of light occurring as light travels from the scintillator to the photodetector.

8. The method as defined in claim 1, wherein comparing the measured magnitude to the reference magnitude comprises obtaining a temperature of one or more of the photodetector, scintillator, or electronics of the scintillation device.

9. The method as defined in claim 1, wherein applying the gain adjustment to the scintillation device comprises one or both of:
adjusting a high voltage component of the scintillation device; and
adjusting a signal amplification of the scintillation device.

10. The method as defined in claim 1, wherein the degradation factor is calculated by measuring a known spectrum.

11. The method as defined in claim 1, wherein the scintillation device is positioned in a downhole system and used to perform an evaluation of a downhole formation.

12. A system for gain stabilization of a scintillation device, comprising:
a reference light source;
a scintillator, wherein the scintillator does not employ an intrinsic radioactive source;
a photodetector optically coupled to the scintillator; and
one or more processors coupled to the reference light source and photodetector and operable to cause the system to perform operations comprising:
emitting light pulses into the scintillation device using a reference light source;
in response to the light pulses, measuring a signal from the scintillation device;
determining a magnitude representative of the measured signal;
comparing the measured magnitude to a target reference magnitude, wherein the target reference magnitude is computed using:
a first variable representing light output of the reference light source as a function of temperature;
a second variable representing light output of the scintillator as a function of the temperature; and
a degradation factor representing systematic gain shifts of the scintillation device;
computing a gain adjustment that causes the measured magnitude to match the target reference magnitude; and
applying the gain adjustment to the scintillation device.

13. The system as defined in claim 12, wherein the measured signal in response to the light pulses is distinctive from signals obtained from other photon sources.

14. The system as defined in claim 12, wherein the measured magnitude is a peak voltage or peak current of the measured signal.

15. The system as defined in claim 12, further comprising an optical fiber directly coupling the reference light source to the photodetector or scintillator.

16. The system as defined in claim 12, wherein the reference light source is an LED or laser.

17. The system as defined in claim 12, wherein the degradation factor is a ratio of a first and second factor, the first factor representing a loss of light occurring as light travels from the reference light source to a photodetector, and the second factor representing a loss of light occurring as light travels from a scintillator to the photodetector.

18. The system as defined in claim 12, further comprising a temperature sensor positioned adjacent the photodetector, scintillator, or electronics of the scintillation device.

19. The system as defined in claim 12, wherein applying the gain adjustment to the scintillation device comprises one or both of:
adjusting a high voltage component of the scintillation device; and
adjusting a signal amplification of the scintillation device.

20. The system as defined in claim 12, wherein the scintillation device is positioned in a downhole system.

* * * * *